United States Patent [19]

Naber et al.

[11] 3,892,677

[45] July 1, 1975

[54] PROCESS FOR REGENERATION OF SULFUR OXIDE ACCEPTORS

[75] Inventors: Jaap E. Naber; Frits M. Dautzenberg, both of Amsterdam, Netherlands

[73] Assignee: Shell Oil Company, Houston, Tex.

[22] Filed: July 15, 1969

[21] Appl. No.: 842,025

[52] U.S. Cl.............................. 252/411 S; 423/541
[51] Int. Cl. ... B01j 11/30; B01j 11/02; B01d 53/34
[58] Field of Search............ 252/411; 23/2.1; 55/73, 55/74; 423/244

[56] References Cited
UNITED STATES PATENTS

| | | | |
|---|---|---|---|
| 2,992,884 | 7/1961 | Bienstock et al. | 23/2.1 |
| 3,411,865 | 4/1968 | Pijpers et al. | 23/178 X |
| 3,428,575 | 2/1969 | Pijpers et al. | 23/2 X |
| 3,501,897 | 3/1970 | Van Helden et al. | 55/73 |

FOREIGN PATENTS OR APPLICATIONS 1,045,610  10/1966  United Kingdom................. 252/411

*Primary Examiner*—Winston A. Douglas
*Assistant Examiner*—P. E. Konopka

[57] ABSTRACT

A process is disclosed for the regeneration of sulfur dioxide-loaded solid, metal containing acceptor obtained by contacting a sulfur oxide- and oxygen-containing gas mixture with the solid acceptor by contacting the loaded acceptor with a reducing gas containing hydrocarbon and an inert diluent, such as steam, thereby reducing the amount of hydrocarbon deposited on the acceptor during regeneration.

11 Claims, No Drawings

3,892,677

PROCESS FOR REGENERATION OF SULFUR OXIDE ACCEPTORS

BACKGROUND

It is known to use metal or metal oxide on a refractory carrier material to remove sulfur oxides from gas mixtures. Such materials are hereinafter called acceptors. Sulfur oxide removal, in particular from hot waste gases having a relatively low sulfur content — such as flue gases and gases originating from roasting processes — has in the past few years become a technical problem. A copper-containing acceptor is attractive as it may be used at flue gas temperatures, that is to say at about 200°–500°C. During contact with the acceptor sulfur dioxide or trioxide is accepted by the copper or copper oxide so that the purified gases, if discharged via a stack, cause substantially no air pollution. The copper sulfate formed during acceptance may subsequently be decomposed by means of a reducing gas, the result being a regenerated acceptor and a gas considerably richer in sulfur dioxide than the flue gas. The regenerated acceptor may be used to purify a further quantity of gas containing sulfur oxides, and the sulfur dioxide-rich gas may be used for any suitable purpose, for example, to produce elemental sulfur or sulfuric acid. Another attractive feature of this acceptor is that acceptance and regeneration may be carried out at substantially the same temperature, cooling or heating of the acceptor between acceptance and regeneration not being necessary.

The regeneration may be carried out with the aid of hydrocarbons, which have the attractive feature of a rapid regeneration rate. It may, however, occur that during regeneration with hydrocarbons, combustible material is deposited on the acceptor. This may be an inconvenience as the oxygen present in the gas mixture being cleaned causes burning of the combustible material during the acceptance step following such a regeneration, and the heat of combustion then liberated causes a temperature increase of the acceptor particles. This temperature increase is undesirable in that it may have an unfavorable effect on the crushing strength of the particles and, consequently, on the acceptor life. The higher the molecular weight of the hydrocarbon used as a regenerating gas, the greater the amount of combustible material deposited. Relatively large quantities of combustible material are deposited when saturated hydrocarbons having more than four carbon atoms per molecule or unsaturated hydrocarbons are used for regeneration. Burning these large quantities of combustible material causes a particularly high temperature increase of the acceptor particles, resulting in a relatively short acceptor life.

THE INVENTION

It is an object of the invention to provide a process in which only minor quantities of combustible material are deposited on the acceptor. Another object is to provide a process in which hydrocarbons are easily recovered from spent regeneration gas.

The present invention accordingly provides a process for the regeneration of a solid sulfur dioxide-loaded acceptor of the character described above obtained by contacting a gas mixture containing sulfur oxide and oxygen with the solid acceptor, which process comprises treating the loaded acceptor with a reducing gas comprising hydrocarbon and an inert diluent, and removing a sulfur dioxide-containing spent reducing gas.

The reducing gas must contain a diluent because it has been found advantageous to decrease the hydrocarbon partial pressure. An acceptor regenerated with hydrocarbon containing a diluent gas contains appreciably less deposited combustible material than an acceptor regenerated with an undiluted hydrocarbon. This finding is of considerable importance, because the above-mentioned temperature increase during acceptance is correspondingly smaller and, consequently, acceptor life is longer. An attractive feature of the process of the invention is, moreover, that the diluent has substantially no influence on the hydrocarbon amount required for complete regeneration, the sulfur dioxide content of the spent gas (without taking into account the diluent) being substantially equal to that of a diluent-free spent gas obtained under the same conditions.

As explained hereinbefore, the metal or metal compound used preferably is copper or copper oxide. Another acceptor having the same advantages as the copper-containing acceptor is one in which the solid carrier material used is composited with a vanadium compound and an alkali metal compound capable of taking up sulfur oxides. Examples of the latter compounds are alkali metal oxides, carbonates and hydroxides.

The volume ratio between the diluent and the hydrocarbons may vary within a wide range. This ratio may be very small, for example, 0.2:1, or very large, for example, 20:1. Preferably, the reducing gas contains inert diluent and hydrocarbon in a volume ratio in the range of from 10:1 to 0.5:1 and particularly in the range of from 6:1 to 1:1.

The diluent must be inert, which means that the diluent itself should be unable to convert copper sulfate into copper or copper oxide. Examples of inert diluents are steam, carbon dioxide and nitrogen. The use of steam is preferred because it is very active in suppressing deposition of combustible material and because it condenses when the spent sulfur dioxide-containing reducing gas is cooled to ambient temperature.

As the molecular weight of hydrocarbon becomes higher, its activity as a reducing agent increases. Methane and ethane may be used, but it is better to employ a reducing gas containing hydrocarbons with at least three carbon atoms per molecule, and reduction is still more rapid if the reducing gas contains hydrocarbons with at least five carbon atoms per molecule. Hydrocarbons having a boiling point at atmospheric pressure in the range of from 40° to 200°C are particularly attractive in this respect and hydrocarbons having a boiling point at atmospheric pressure higher than 200°C may be used as well.

The spent reducing gas contains mainly sulfur dioxide, carbon dioxide, water, hydrocarbons and inert diluent. Hydrocarbons recovered from the sulfur dioxide-containing spent gas are preferably reused in the process. Hydrocarbon recovery may, for example, be carried out with the aid of a solvent which physically dissolves sulfur dioxide and carbon dioxide, for example, with cyclotetramethylene sulfone when normally gaseous hydrocarbons such as methane, ethane, propane or butane are used as reducing gases. When hydrocarbons having a boiling point at atmospheric pressure in the range of from 40° to 200°C are employed, they may easily be removed from a spent gas by means of condensation and no solvent is required. Therefore, when the reducing gas contains hydrocarbons with at least five carbon atoms per molecule, said sulfur dioxide-containing spent reducing gas is preferably cooled until a hydrocarbon condensate is formed, which condensate, after evaporation, is re-used in the process. For example, when a spent gas containing hydrocarbons boiling in the range between 100° and 200°C is cooled to 50°C, a very large part of these hydrocarbons are condensed along with steam if it is the diluent, leaving a gas very rich in sulfur dioxide. This separation may be accomplished by cooling the spent gas at atmospheric pressure. Hydrocarbons having less than five carbon atoms per molecule may also be removed by condensing them, but this requires a pressure higher than atmospheric.

The carrier material used in the acceptor must be refractory and may, for example, comprise an alumina-containing refractory oxide. Bauxite, synthetic alumina, silica-alumina and/or natural clays, whether or not pretreated with acid, are examples of suitable carriers. A very suitable carrier material is $\gamma$-alumina. Other examples of carrier materials are silica and silica-magnesia.

The metal content of the acceptor may vary within wide limits. The acceptor preferably comprises of from 5 to 15% by weight of metal, calculated as metal on carrier material.

The temperature at which the copper sulfate is reduced may vary within a wide range. Preferably, the loaded acceptor is treated at a temperature in the range of from 200° to 500°C and particularly in the range of from 350° to 450°C. For example, the reducing gas may be n-octane and a temperature of 370°C may be used.

The acceptor may be formed in any suitable manner, for example, the carrier material may be impregnated with an aqueous solution containing copper sulfate, followed by drying and calcining of the impregnated material. Therefore, the present invention also relates to a process for the preparation of metal or metal oxide on a refractory carrier material by reducing a metal sulfate present on said carrier material with a gas containing hydrocarbon and an inert diluent. The metal or metal oxide thus prepared may be used for any suitable purpose but is particularly useful as an oxidation catalyst.

The process of the invention will further be illustrated with the aid of the following examples.

EXAMPLE I

A reactor comprising a number of thin and parallel acceptor layers, each layer having a length of 500 cm was charged with 71.1 kg (114.5 l) of an acceptor containing metallic copper (9%w copper calculated on alumina) on $\gamma$-alumina. The acceptor was loaded by conducting a flue gas containing 2.9%w sulfur dioxide at a temperature of 425°C and a gas hourly space velocity of 5200 cubic meters of gas at normal conditions per cubic meter of acceptor per hour ($Nm^3/m^3/h$) through the gas channels present between the acceptor layers. Then, the loaded acceptor was regenerated at 425°C at a gas hourly space velocity of 28 $Nm^3$ butane/$m^3$/h. In a first experiment, the loaded acceptor was regenerated with a gas consisting of n-butane and the acceptor thus regenerated again loaded with sulfur dioxide as described above. In a second experiment the loaded acceptor was regenerated with a mixture consisting of equal molar quantities of n-butane and steam. Subsequently, the regenerated acceptor was again loaded with sulfur dioxide as described above. Table I shows the temperature increase after the start of the load-up at three places in the reactor.

Table I

| Distance from Reaction Inlet, m | Temperature Increase During Load-Up, °C After Regeneration With | |
|---|---|---|
| | n-butane | diluted butane |
| 3 | 147 | 60 |
| 4 | 153 | 81 |
| 5 | 160 | 57 |

Some data on the sulfur dioxide content of the spent regeneration gas at various times after the start of the regeneration are presented in Table II.

Table II

| After Start of Regeneration, Minutes | $SO_2$ Content of Spent Regeneration Gas, %v When Regenerating With | |
|---|---|---|
| | n-butane | diluted butane |
| 5 | 36.5 | 34.5 |
| 10 | 20.5 | 22.5 |
| 20 | 9.5 | 4.5 |
| 40 | 3.5 | 0.5 |

The sulfur dioxide contents have been calculated without taking into account the steam added to the n-butane. The results collected in Table II show that at a given time after the start of regeneration the sulfur dioxide contents of the spent regeneration gases are substantially the same.

EXAMPLE II

The experiments described in Example I were repeated, except that the loaded acceptor was regenerated with a light gasoline fraction boiling between 40° and 100°C. In one experiment the loaded acceptor was regenerated with the gasoline fraction as such at a gas hourly space velocity of 16 $Nm^3/m^3/h$. In another experiment the loaded acceptor was regenerated with a mixture consisting of 21.7%v gasoline, 41.3%v steam and 37.0%v nitrogen at a gas hourly space velocity of 20 $Nm^3$ gasoline/$m^3$/h.

Table III

| Distance from Reactor Inlet, m | Temperature Increase During Load-Up, °C, after Regeneration with | |
|---|---|---|
| | undiluted gasoline | diluted gasoline |
| 2 | 114 | 32 |
| 3 | 156 | 54 |
| 4 | 184 | 72 |
| 5 | 172 | 86 |

EXAMPLE III

The acceptor present in the reactor described in Example I was loaded and then regenerated with the aid of a gasoline fraction boiling between 60° and 80°C, and diluted with a mixture of equal molar quantities of nitrogen and steam. The results of three of these experiments are given in Table IV.

Table IV

| Distance From Reactor Inlet, | Temperature Increase During Load-Up, °C, After Regeneration With | | | |
|---|---|---|---|---|
| | Undiluted Gasoline | Diluted Gasoline, Volume Ratio Between Diluent and Gasoline Vapor | | |
| | | 2.5 | 3.6 | 5.5 |
| 2 | 114 | 48 | 36 | 36 |
| 3 | 156 | 77 | 55 | 36 |
| 4 | 184 | 110 | 74 | 50 |
| 5 | 172 | 104 | 84 | 56 |

The space velocities during regeneration were 18, 20 and 8 Nm$^3$ of gasoline vapor/m$^3$ acceptor/hour, relating to the volume ratios 2.5, 3.6 and 5.5, respectively.

EXAMPLE IV

The acceptor present in the reactor described in Example I was loaded and then regenerated with the aid of a gasoline fraction boiling between 100° and 160°C, diluted with steam. The results of two experiments are presented in Table V.

Table V

| Distance From Reactor Inlet, m | Temperature Increase During Load-Up, °C, at a Volume Ratio Between Steam and Gasoline Vapor of | |
|---|---|---|
| | 3.5 | 8.8 |
| 2 | 112 | 44 |
| 3 | 103 | 52 |
| 4 | 171 | 82 |
| 5 | 151 | 44 |

The space velocity of the regeneration relating to the middle column was 16.7 and that to the right-hand column of Table V was 6.6 Nm$^3$ gasoline vapor/m$^3$ acceptor/hour.

We claim as our invention:

1. A process for the regeneration of a sulfur oxide-loaded acceptor obtained by contacting a sulfur oxide- and oxygen-containing gas mixture with a solid acceptor of a solid refractory carrier material composited with a metal or a metal compound capable of taking up sulfur oxides, which comprises treating said loaded acceptor at a temperature of 200° to 500°C with a reducing gas comprising an inert diluent and a hydrocarbon in a volume ratio of 0.2:1 to 20:1, said hydrocarbon having at least three carbon atoms per molecule; and removing a sulfur dioxide-containing spent reducing gas.

2. The process of claim 1 in which the metal or metal compound is copper or copper oxide.

3. The process of claim 1 in which said solid carrier material is composited with a vanadium compound and an alkali metal compound capable of taking up sulfur oxides.

4. The process of claim 1 in which the reducing gas comprises inert diluent and hydrocarbon in a volume ratio in the range of from 10:1 to 0.5:1.

5. The process of claim 1 in which the reducing gas comprises inert diluent and hydrocarbon in a volume ratio in the range of from 6:1 to 1:1.

6. The process of claim 1 in which said inert diluent is steam.

7. The process of claim 1 in which the reducing gas contains hydrocarbon with at least five carbon atoms per molecule.

8. The process of claim 1 in which the reducing gas contains hydrocarbon having a boiling point at atmospheric pressure in the range of from 40° to 200°C.

9. The process of claim 1 in which said spent reducing gas is cooled until a hydrocarbon condensate is formed, which condensate is evaporated and re-used in the process.

10. The process of claim 1 in which the loaded acceptor is treated at a temperature in the range of from 350° to 450°C.

11. The process of claim 5 wherein the inert diluent is steam and the hydrocarbon has at least five carbon atoms per molecule.

* * * * *